(12) United States Patent
Yasuda et al.

(10) Patent No.: US 8,846,139 B2
(45) Date of Patent: Sep. 30, 2014

(54) COATING APPARATUS AND FILM PRODUCTION METHOD USING THE SAME

(75) Inventors: Kenichi Yasuda, Minami-Ashigara (JP); Ryousuke Shimizu, Minami-ashigara (JP); Kazuhiro Oki, Minami-ashigara (JP)

(73) Assignee: Fujifilm Corporation, Tokyo (JP)

( * ) Notice: Subject to any disclaimer, the term of this patent is extended or adjusted under 35 U.S.C. 154(b) by 808 days.

(21) Appl. No.: 13/007,043

(22) Filed: Jan. 14, 2011

(65) Prior Publication Data
US 2011/0171376 A1     Jul. 14, 2011

(30) Foreign Application Priority Data

Jan. 14, 2010  (JP) ................................. 2010-006166

(51) Int. Cl.
*B05D 5/06*      (2006.01)
*G05D 7/01*      (2006.01)
*B05C 5/02*      (2006.01)
*B29D 11/00*     (2006.01)
*G02B 5/30*      (2006.01)
*G02B 1/11*      (2006.01)
*B05C 11/04*     (2006.01)

(52) U.S. Cl.
CPC .......... *B29D 11/0073* (2013.01); *G02B 5/3083* (2013.01); *G02B 1/11* (2013.01); *G05D 7/0186* (2013.01); *B05C 11/044* (2013.01); *B05C 5/0254* (2013.01); *B05C 11/04* (2013.01)
USPC ............................. 427/162; 118/325; 118/419

(58) Field of Classification Search
USPC ............................. 427/162–169; 118/325, 419
See application file for complete search history.

(56) References Cited

U.S. PATENT DOCUMENTS

2007/0062445 A1 * 3/2007 Kodou et al. ................. 118/325

FOREIGN PATENT DOCUMENTS

| JP | 5-031434     | 2/1993  |
|----|--------------|---------|
| JP | 7-310889     | 11/1995 |
| JP | 2002-045761  | 2/2002  |
| JP | 2003-010761  | 1/2003  |
| JP | 2003-3340355 | 12/2003 |
| JP | 2004-351291  | 12/2004 |
| JP | 2006-233858  | 9/2006  |
| JP | 2007-245024  | 9/2007  |

OTHER PUBLICATIONS

Machine translation of JP 2007-245024.*

* cited by examiner

*Primary Examiner* — Elizabeth Burkhart
(74) *Attorney, Agent, or Firm* — Young & Thompson (57) ABSTRACT

A coating apparatus includes: a slot die configured to apply coating solution on a support by discharging the coating solution from a tip of a slot and forming a coating solution bead in a clearance between the tip of the slot and the support; a pipe through which the coating solution is fed to a pocket of the slot die; an orifice formed in the pipe at a position nearer a circumference of a circular cross section in a radial direction of the pipe in relation to a center of the circular cross section; a forward tapered inlet channel which is formed at an entrance side of the orifice in the pipe and whose aperture narrows to the orifice; a rearward tapered outlet channel which is formed at an exit side of the orifice in the pipe and whose aperture grows toward a downstream.

12 Claims, 10 Drawing Sheets

| TEST No. | POSITION OF ORIFICE | TAPERED INLET CHANNEL | TAPERED OUTLET CHANNEL | PULSATION PERCENTAGE (%) | ACCUMULATION OF BUBBLES | RETENTION OF LIQUID | OVERALL EVALUATION |
|---|---|---|---|---|---|---|---|
| 1 | UPPER EDGE PORTION | PRESENT | PRESENT | 0.5 | A | A | A |
| 2 | CENTRAL POSITION | PRESENT | PRESENT | 2.0 | A | A | E |
| 3 | LOWER EDGE PORTION | PRESENT | PRESENT | 0.5 | A | A | A |
| 4 | UPPER EDGE PORTION | PRESENT | NOT PRESENT | 0.5 | A | E | E |
| 5 | CENTRAL POSITION | PRESENT | NOT PRESENT | 0.5 | C | D | E |
| 6 | LOWER EDGE PORTION | PRESENT | NOT PRESENT | 0.5 | C | D | E |
| 7 | UPPER EDGE PORTION | NOT PRESENT | PRESENT | 0.5 | A | B | E |
| 8 | CENTRAL POSITION | NOT PRESENT | PRESENT | 2.0 | B | B | E |
| 9 | LOWER EDGE PORTION | NOT PRESENT | PRESENT | 0.5 | B | B | E |
| 10 | UPPER EDGE PORTION | NOT PRESENT | NOT PRESENT | 0.5 | A | E | E |
| 11 | 1/2 POSITION | PRESENT | PRESENT | 1.5 | A | A | E |
| 12 | 2/3 POSITION | PRESENT | PRESENT | 0.5 | A | A | A |

US 8,846,139 B2

COATING APPARATUS AND FILM PRODUCTION METHOD USING THE SAME

BACKGROUND OF THE INVENTION

1. Field of the Invention

The present invention relates to a coating apparatus and a process for producing an optical film using the same, and more specifically to a coating technique for preventing stepped irregularities when producing an optical film used for liquid crystal display devices.

2. Description of the Related Art

Optical films such as anti-reflection films are used for various image display devices such as liquid crystal display devices (LCDs), plasma display panels (PDPs), electroluminescence displays (ELDs) and cathode ray tubes (CRTs). Anti-reflection films are also used for lenses of glasses and cameras.

For such anti-reflection films, multilayer films prepared by stacking transparent thin films of metal oxide have been generally used so far. The reason for using a plurality of transparent thin films is to prevent light from reflecting in as wide a visible wavelength range as possible. These transparent thin films of metal oxide are formed by a chemical vapor deposition (CVD) method or a physical vapor deposition (PVD) method, and more specifically, a vacuum deposition method or a sputtering method which is one of the physical vapor deposition methods.

However, the chemical vapor deposition (CVD) methods and the physical vapor deposition (PVD) methods are inefficient, and thus instead of them, a coating method in which a coating solution for an anti-reflection film is applied to a support has been employed.

Examples of coating apparatuses for forming a coating film by a coating method include bar coaters, reverse roll coaters, gravure roll coaters and slot die coaters (extrusion coaters). Since slot die coaters are capable of forming a thinner layer at a higher speed compared to other coating apparatuses, they have been frequently used as a coating apparatus for forming an optical film.

In the production of an anti-reflection film by coating of a thin layer using such a slot die coater, the uniformity in film thickness has a great influence on the performance of products, and therefore extremely severe conditions are required. Recently, in particular, there has been a growing demand for a technique of precise coating in a region of 10 μm or less, which is thinner than conventional wet film thickness, to achieve the desired functions.

In other words, the above optical films need to have a strictly accurate coating film thickness and coating film properties and require highly accurate thin film coating technique. For anti-reflection films, in particular, a very small variation in film thickness (stepped irregularities) causes a change in the antireflection rate, and the desired antireflection ability will not be shown.

To achieve highly accurate thin layer coating using a slot die coater, it is necessary to form a stable and uniform coating solution bead between a slot die and a web. The bead becomes unstable because of the vibration of the slot die or peripheral equipment or the variation of pressure reduction value, and in particular, liquid feed pulsation when supplying a coating solution to a slot die is considered to be the major cause.

The liquid feed pulsation directly causes a variation in the discharge rate of a coating solution through a slot die and causes a change in the shape of the bead. As a result, surface defects of thick film and thin film alternately formed in the running direction of a support, which are so-called stepped irregularities, are generated on the coated surface of the support.

The liquid feed pulsation of the coating solution is caused by various factors such as pulsation in a pump which supplies a coating solution, the influence from a defoaming apparatus arranged in a liquid feed line or vibration of a pipe line, and it is very difficult to solve this problem.

Various proposals have been made to solve the problem of the liquid feed pulsation of coating solution (see Japanese Patent Application Laid-Open Nos. 5-31434, 2003-340355, 2004-351291, 2003-10761 and 2002-45761), but the troubles caused by the pulsation of coating solution have not yet been completely solved.

Under such circumstances, the applicant has proposed formation of an orifice in a pocket or at a liquid feed port of the pocket of a slot die as described in Japanese Patent Application Laid-Open No. 2007-245024.

SUMMARY OF THE INVENTION

However, it has been proved that although the orifice can prevent the transmission of liquid feed pulsation which occurs upstream of the orifice in Japanese Patent Application Laid-Open No. 2007-245024, there is a problem that another very small pulsation is caused downstream of the orifice when the orifice restricts the pipe channel.

Recently the demand for the antireflection ability of anti-reflection films has become increasingly strict and thus it has become necessary to prevent even very small pulsation which occurs downstream in order to produce an anti-reflection film having 2% or less of stepped irregularities. Also, stepped irregularities in optical films other than anti-reflection films, such as optical compensation films, anti-glare films and anti-glare anti-reflection films need to be 2% or less.

Accordingly, further improvement is necessary to prevent liquid feed pulsation with an orifice. To this end, it is necessary to avoid the occurrence of secondary surface defects which are caused when bubbles in coating solution tends to accumulated upstream of the orifice or when retention of coating solution tends to occur downstream of the orifice.

The present invention has been made under such circumstances, and an object thereof is to provide a coating apparatus with a simple structure and production method of an optical film using the same which can keep stepped irregularities in a coating film applied to a support at 2% or less since the coating apparatus and the production method not only can prevent liquid feed pulsation occurring upstream of an orifice but also can effectively suppress very small pulsation occurring downstream, and can causes no accumulation of bubbles or retention of liquid.

To achieve the aforementioned object, a coating apparatus according to a first aspect of the present invention, includes: a slot die configured to apply the coating solution on a continuously running support by discharging the coating solution from a tip of a slot and forming a coating solution bead in a clearance between the tip of the slot and the support; a pipe through which the coating solution is fed to a pocket of the slot die; an orifice formed in the pipe at a position nearer a circumference of a circular cross section in a radial direction of the pipe than a center of the circular cross section; a forward tapered inlet channel which is formed at an entrance side of the orifice in the pipe and whose aperture narrows to the orifice; a rearward tapered outlet channel which is formed at an exit side of the orifice in the pipe and whose aperture grows toward a downstream. The "orifice" generally means a perforated circular disk inserted in a pipe line, which restricts the channel and detects a change in pressure to measure a flow rate, but the orifice herein refers to a small pore for restricting a pipe channel.

The inventor has intensively studied the cause of very small pulsation occurring downstream of an orifice (pore) and as a result, has found that the very small pulsation can be effectively prevented with a simple structure in which an orifice is formed at an edge portion in the pipe radial direction, not at the central position, in the pipe radial direction. The inventor has also found that even the concern about the accumulation of bubbles and the retention of liquid caused by forming an orifice at an edge portion in the pipe radial direction can be eliminated by forming a forward tapered inlet channel on the inlet side of the orifice and a rearward tapered (club-shaped) outlet channel on the exit side of the orifice.

According to the present invention, an orifice is formed at an edge portion in the pipe radial direction, and at the same time, a forward tapered inlet channel leading to the orifice is formed on the inlet side of the orifice and a rearward tapered outlet channel extending from the orifice is formed on the exit side of the orifice. This makes it possible to not only prevent liquid feed pulsation which occurs upstream of the orifice but also effectively suppress very small pulsation which occurs downstream, suppressing stepped irregularities in a coating film applied to a support to 2% or less. Further, by providing the forward tapered inlet channel and the rearward tapered outlet channel, accumulation of bubbles or retention of liquid which are feared to be caused by forming an orifice at an edge portion will not occur.

Therefore, when, for example, an anti-reflection film is produced by using this coating apparatus, a film having unprecedentedly high anti-reflection ability can be produced. Also, using this coating apparatus makes it possible to produce not only high precision anti-reflection films but also high precision optical films such as optical compensation films, anti-glare films and anti-glare anti-reflection films in which surface defects such as stepped irregularities or bubble defects are suppressed.

In the coating apparatus of the present invention, it is preferred that the position where the orifice is formed is in a region ⅔ of a diameter of the pipe or more outside in relation to the center of the pipe in the radial distance in the circular cross section of the pipe. This enables very small pulsation downstream of the orifice to be suppressed more effectively.

It is preferred that the orifice be formed in a distance 5000 mm or less from the liquid feed port of the pocket of the slot die. Also, a area ratio of a cross-sectional area of the pore of the orifice to a cross-sectional area of the pipe is preferably 0.1 or less.

In the coating apparatus of the present invention, it is preferred that when the length from a taper starting position to the orifice position in the pipe longitudinal direction is represented by L1 and the diameter of the pipe is represented by R, the forward tapered inlet channel satisfy $L1 \geq (1/4)R$.

Also, it is preferred that when the length from the orifice position to a taper end position in the pipe longitudinal direction is represented by L2 and the diameter of the pipe is represented by R, the rearward tapered outlet channel satisfy $L2 \geq (1/4)R$.

This is because when L1 and L2 are smaller than $(1/4)R$ and thus the forward tapered inlet channel and the rearward tapered outlet channel have a taper angle close to 90°, accumulation of bubbles or retention of liquid is likely to be caused upstream and downstream of the orifice.

The limit for increasing L1 and L2 to be larger than $(1/4)R$ is preferably $10R \geq L1$ and $10R \geq L2$, more preferably $5R \geq L1$ and $5R \geq L2$, and particularly preferably $2R \geq L1$ and $2R \geq L2$.

To achieve the aforementioned object, a film production method according to another aspect of the present invention includes: a coating step of apply the coating solution on a continuously running support from a slot die using the coating apparatus according to claim 1 to form a coating layer; and a drying step of drying the coating layer which has been formed in the coating step.

According to the film production method for producing a film of the present invention, a coating solution is applied to a support in the coating step using any one of the coating apparatuses according to the first aspect. Therefore, a high precision optical film without coating failure such as stepped irregularities or bubble defects can be produced.

Here, the "stepped irregularities" mean surface defects in which coating having thick film thickness and coating having thin film thickness alternately are formed in the running (conveyance) direction of a support. Also, the "bubble defects" mean surface defects in which a line with a coating film thickness thinner than other portions is formed in the running direction of a support, which are caused when bubbles in a coating solution are caught in the narrow slot of a slot die and therefore the amount of the coating solution at the portion where bubbles have been caught becomes smaller than that in other portions.

The film production method of the present invention is particularly useful for production of optical compensation films, anti-reflection films, anti-glare films and anti-glare anti-reflection films in which good optical properties cannot be achieved when stepped irregularities are formed in the coating film. The percentage of stepped irregularities in these optical films is preferably 2% or less, more preferably 1% or less.

As described above, the coating apparatus of the present invention can, with a simple structure, prevent very small pulsation occurring downstream of an orifice and also can suppress stepped irregularities in a coating film applied to a support to 2% or less since no accumulation of bubbles or retention of liquid is caused.

Accordingly, when an optical-use coating solution is applied to a support using the coating apparatus of the present invention as in the film production method of the present invention, a film (for example, an optical film) having excellent optical properties can be obtained.

DETAILED DESCRIPTION OF THE PREFERRED EMBODIMENTS

In the following, preferred embodiments of the coating apparatus of the present invention and the process for producing an optical film using the same will be described in detail.
[General Structure of Coating Apparatus]

Figure 1:
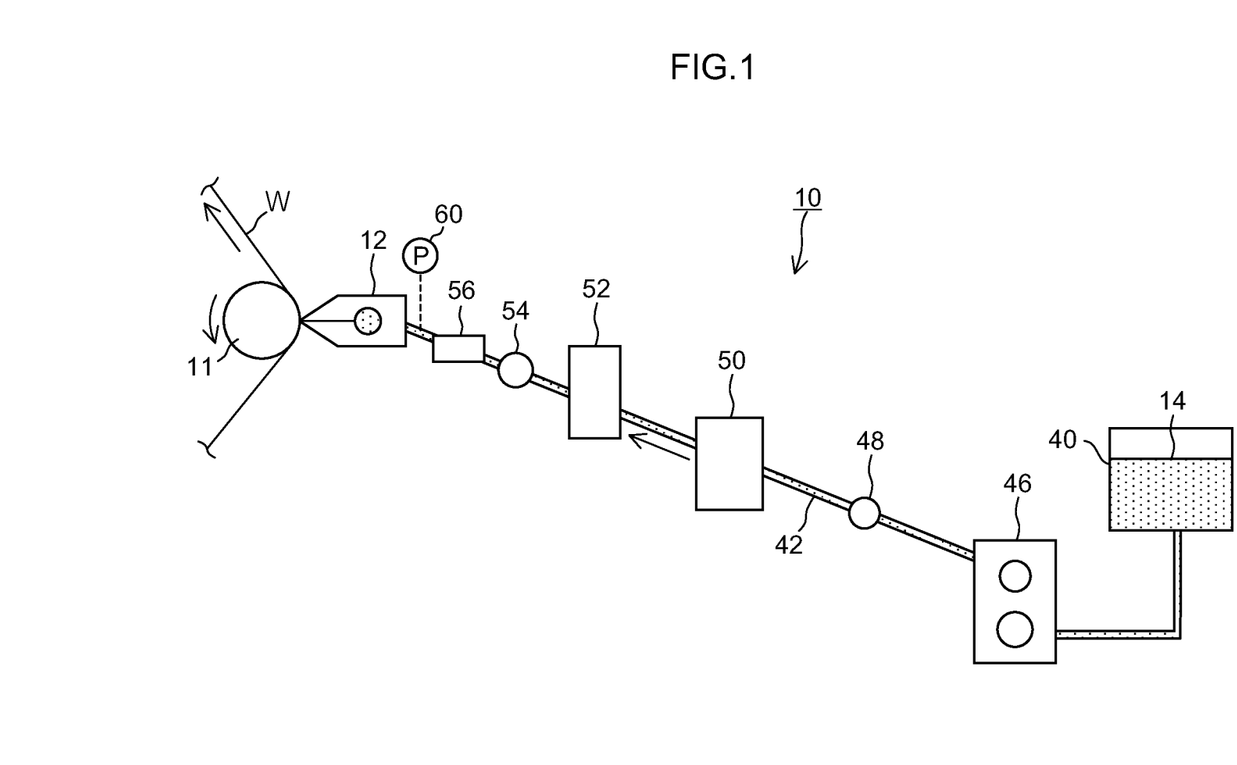
FIG. 1 is a general schematic view of an embodiment of the inventive coating apparatus.

FIG. 1 illustrates a coating apparatus according to the embodiment installed in a coating step in a production line of an anti-reflection film. Although this embodiment illustrates an example installed in a coating step in a production line of an anti-reflection film, the coating apparatus is not limited thereto and can be applied to optical films such as optical compensation films, anti-glare films and anti-glare anti-reflection films.

In the production line of an anti-reflection film, a necessary number of coating steps, drying steps (sometimes including a step of curing coating film) and other steps are established between a step of continuously reeling out (feeding) a rolled support film (hereinafter referred to as a "web") W and a step of taking up the web W.

In the coating apparatus 10 shown in FIG. 1, a slot die 12 is provided to face with a back-up roller 11 on which the web W is wound at a coating position. An anti-reflection use coating solution 14 is fed to the slot die 12 through pipe 42. More specifically, the slot die 12 is communicated with a coating solution tank 40 for storing the coating solution 14 via a pipe 42, and a liquid feed pump 46, a pressure gauge 48, a vacuum deaerator 50, a filter 52, a flow meter 54 and an orifice portion 56 are provided along the pipe 42 in that order from the upstream side.

It is preferred that the pipe 42 have an inner diameter of 15 mm or less and is composed of a straight-shaped fluorine resin or a metal member whose inner periphery has been polished. The use of such a straight-shaped fluorine resin (e.g., Teflon™) or a metal member whose inner periphery has been polished for the pipe 42 having a small diameter creates good flow of the coating solution 14 through the pipe and is effective for avoiding bubbles.

Also, to remove liquid feed pulsation from the liquid feed line, it is preferred that the transmission of vibration in the pipe 42 be reduced before the orifice portion 56. Therefore, a structure in which the pipe itself is formed of a low rigidity fluorine resin (e.g., Teflon™) or of a thin bellows-type pipe, or in which a vibration damping material is used is preferred.

Although various types of known pumps may be used as the liquid feed pump 46, when a pressurized state is created in the pipe 42 as in the present invention, the liquid feed pump 46 for feeding the coating solution 14 is particularly preferably a diaphragm pump.

Various types of known pressure gauges may be used as the pressure gauge 48. For the filter 52 and the vacuum deaerator 50, those having an appropriate structure may be employed depending on the composition of the coating solution 14. Although various types of known flow meters may be used as the flow meter 54, a Coriolis flow meter may be preferably used.

It is preferred that the orifice portion 56 be arranged at the end of the instruments 46, 48, 50, 52 and 54 described above, namely, at a position closest to the slot die 12. More specifically, it is preferred that the orifice portion 56 be provided in a distance of 5000 mm or less from the liquid feed port 22 of the pocket 18 of the slot die 12. The orifice portion 56 will be described in detail later.

Figure 2:
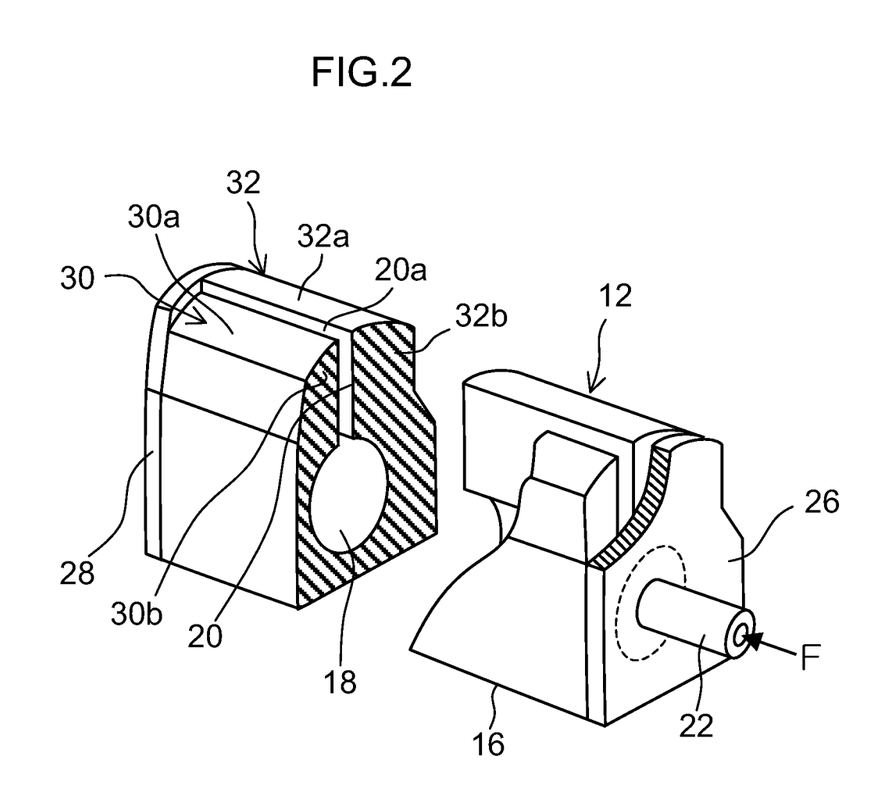
FIG. 2 is a perspective view illustrating the inside of a slot die which is partially cut.
Figure 3:
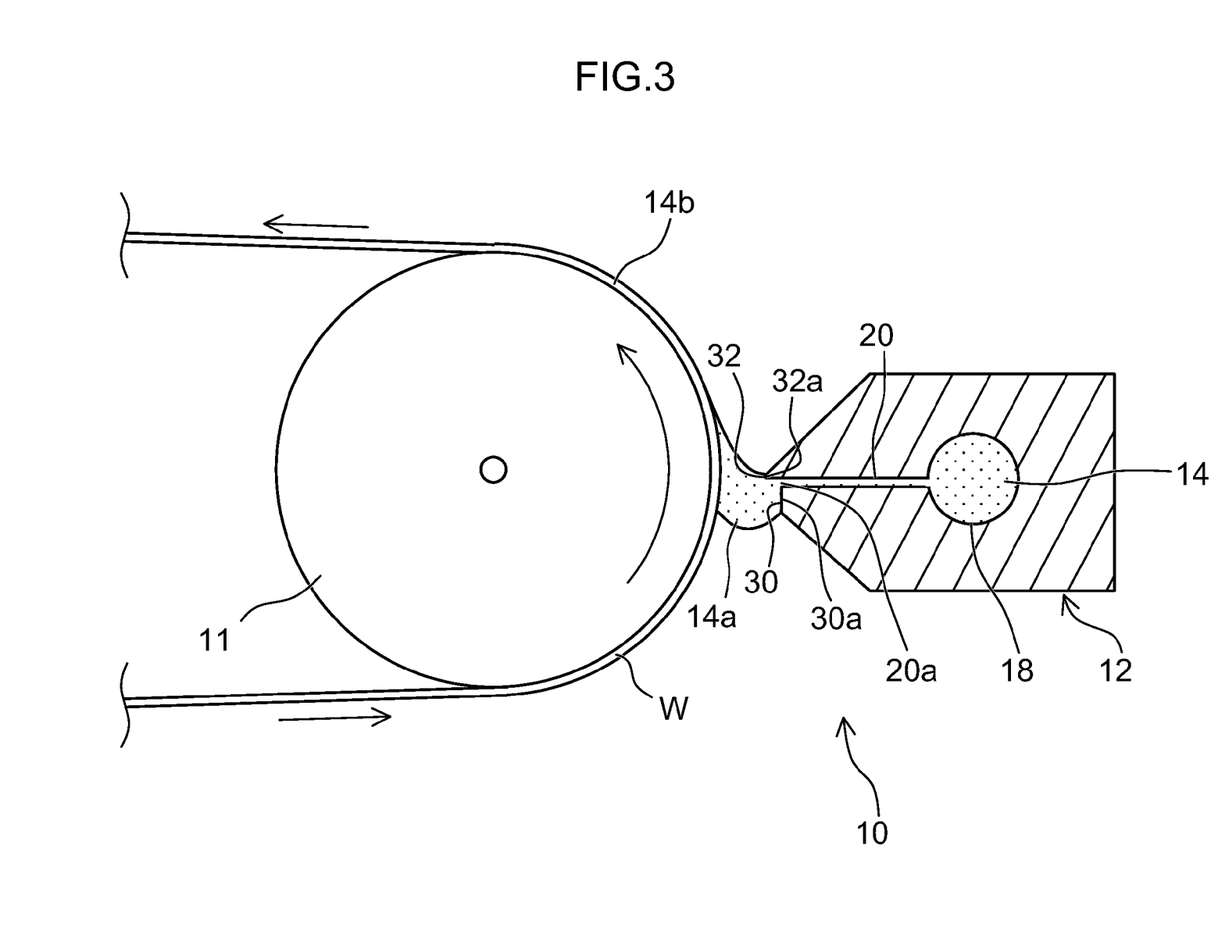
FIG. 3 is an explanatory view illustrating application of a coating solution to a web through a slot die.

FIG. 2 is a perspective view of a slot die (coating head) 12 which is partially cut, and FIG. 3 is a schematic cross-sectional view illustrating the position of the tip of the slot die 12 and the web W.

As FIG. 2 and FIG. 3 show, the slot die 12 has the following liquid feeding system capable of feeding the coating solution 14. Specifically, the slot die 12 has a pocket (liquid storage part) 18 extending in the longitudinal direction (width direction of the web W), a slot 20 (also a slit) communicated with the pocket 18 and faced with the web W in the longitudinal direction (width direction of the web W), which discharges a coating solution from the tip 20a of the slot, and a liquid feed port 22 for feeding the coating solution 14 to the pocket 18.

The pocket 18 is also referred to as a "liquid storage part" or a "manifold" whose cross-section is almost circular. As FIG. 2 shows, the pocket 18 is a cavity extending in the width direction of the web W in almost consistent cross-sectional shape and having a function of storing liquid. The effective length is generally determined to be equal to or slightly longer than the coating width. The both end through openings of the pocket 18 are closed by closing plates 26, 28 attached to the both ends of a main body 16 as shown in FIG. 2. The already-described liquid feed port 22 is formed on the closing plate 26.

The slot 20 is a narrow channel piercing through the main body 16 of the slot die 12 from the pocket 18 toward the web W with a narrow opening width (slot clearance) and extending in the width direction of the web W as the pocket 18 does. The opening length in the width direction of the web W is determined to be substantially the same as the coating width. Slot dies used for anti-reflection films have a slot clearance of generally 150 μm or less. When the slot clearance is as narrow as herein described and the coating solution contains bubbles, bubbles are likely to be caught in the inlet of the slot. As a result, the amount of the coating solution at a portion where bubbles have been caught becomes smaller than that in other portions, generating a line with a coating film thickness thinner than other portions in the running direction of the web W. This is a bubble defect formed in a coating film.

The distance from the boundary of the pocket 18 of the slot 20 to the tip 20a of the slot (the length of the channel toward the web W) may be appropriately determined in consideration of conditions such as the opening length of the slot 20 in the width direction of the web W and the liquid composition, properties, flow rates and pressures of feeding of the coating solution. In short, the length may be determined so that the coating solution can be supplied in a laminar flow at a uniform flow rate and liquid pressure distribution in the width direction of the web W through slot 20. For example, when the opening length of the slot 20 in the width direction of the web W is about 1000 to 1200 mm, the distance from the boundary of the pocket 18 to the tip 20a of the slot ranging from 30 to 80 mm may be preferably selected, but the distance is not limited thereto.

The slot 20 is constituted by a front edge 30 and a back edge 32 of the main body 16 of the slot die 12. A front edge surface 30a and a back edge surface 32a are each formed on the upper surface (surface opposed to the web W) of the main body 16 of the slot die 12 from the upstream.

As FIG. 2 shows, the front edge surface 30a has an almost linear cross-section and the back edge surface 32a has a mound-shaped (slightly bumped shape) cross-section. The rear end edge portion 30b of the front edge surface 30a and the tip end edge portion 32b of the back edge surface 32a have a pre-determined difference so that a film of the coating solution 14 having a pre-determined thickness can be formed.

FIG. 2 shows an example of cross-sectional shapes of the front edge surface 30a and the back edge surface 32a, and other cross-sectional shapes such as circular shapes or parabolic shapes may be employed.

Next, the tip of the slot die 12 will be described referring to FIG. 3. In FIG. 3, the front edge surface 30a and the back edge surface 32a have a cross-sectional shape different from that in FIG. 2.

In the coating apparatus 10 shown in FIG. 3, a coating solution 14 is applied to a web W which is supported by a back-up roller 11 and runs continuously in the form of bead 14a through a slot die 12 to form a coating film 14b on the web W.

At the tip 20a of the slot 20, the slot 20 has an angle of preferably 30° to 90° (both inclusive) relative to a tangent to the back-up roller 11 in the web running direction.

The front edge surface 30a of the front edge 30 and the back edge 32 of the slot die 12 where the tip 20a of the slot is located is made flat while the back edge surface 32a is made tapered.

It is preferable to make the above-described slot die 12 resistant to vibration for accurate coating. To this end, it is preferable to minimize the influence of vibration by, for example, building a foundation of the slot die 12 independent from the other devices of the coating apparatus. Also, a stable structure can be established by increasing the weight of the slot die 12.

[Orifice Portion]

Next, the orifice portion 56 which is a feature of the present invention will be described.

Figure 4:
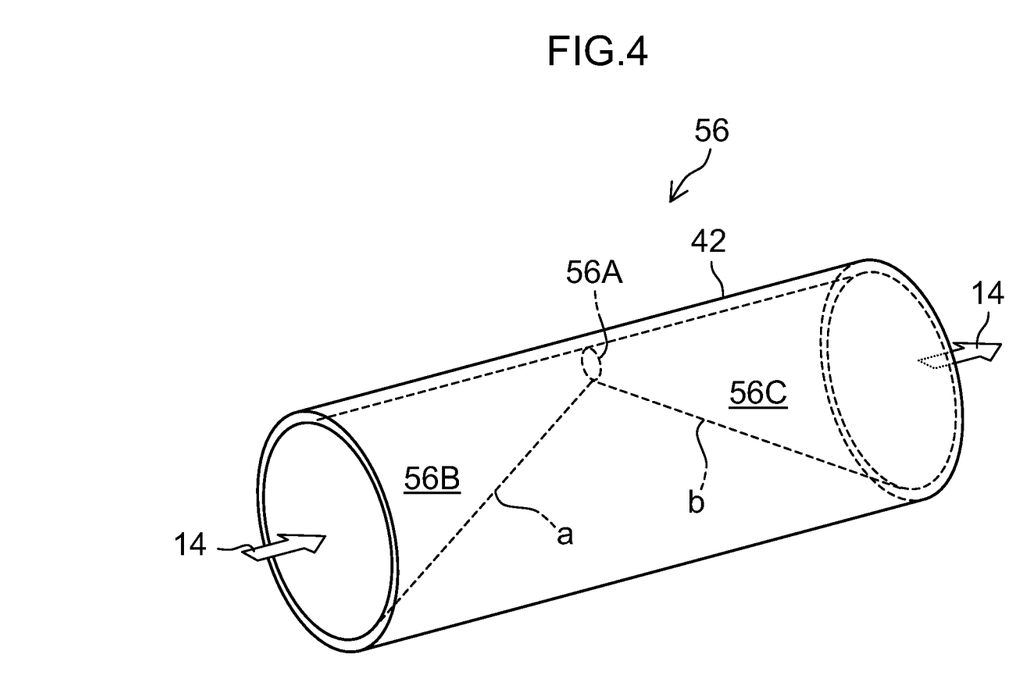
FIG. 4 is an explanatory view illustrating a structure of an orifice portion.

As shown in FIG. 4, the orifice portion 56 includes an orifice (pore) 56A, a forward tapered inlet channel 56B and a rearward tapered outlet channel 56C. The orifice 56A is formed at an edge portion in the radial direction of the pipe 42. In other words, the orifice 56A is formed at a position nearer a circumference of a circular cross section in a radial direction of the pipe 42 in relation to a center of the circular cross section of the pipe 42. The forward tapered inlet channel 56B leading to the orifice 56A is formed on the inlet side of the orifice 56A and a rearward tapered (club-shaped) outlet channel 56C extending from the orifice 56A is formed on the exit side of the orifice 56A. More specifically, the tapered inlet channel 56B is made forward tapered with inlet taper a (i.e., an aperture of the forward tapered inlet channel 56B narrows to the orifice) and the tapered outlet channel 56C is made rearward tapered with outlet taper b (i.e., an aperture of the rearward tapered outlet channel 56C grows toward a downstream of the pipe 42).

Figure 5:
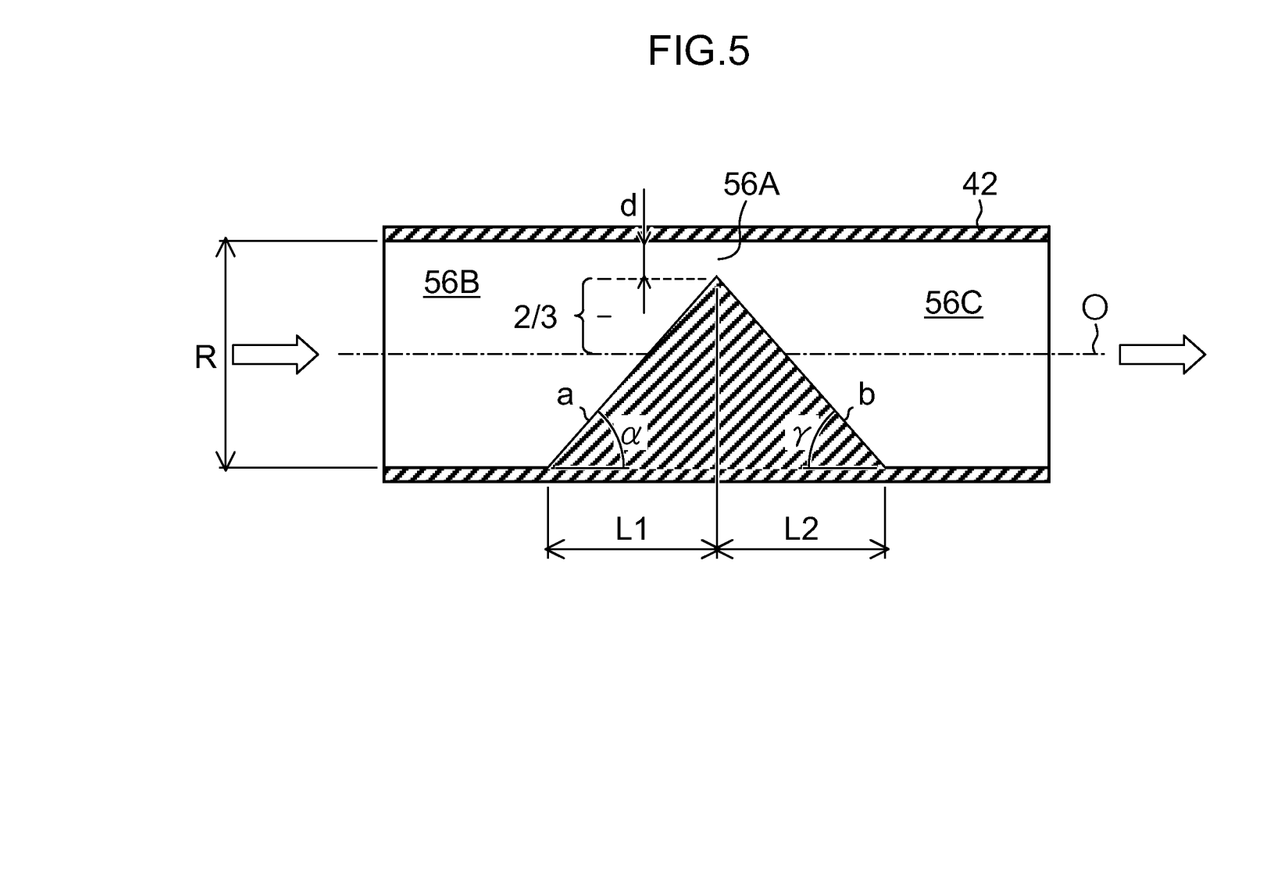
FIG. 5 is an explanatory view illustrating the position where an orifice is formed.

Also, as shown in FIG. 5, it is preferred the edge portion in the radial direction of the pipe 42 where the orifice 56A is formed is in a region ⅔ of a diameter of the pipe 42 (pipe diameter) or more outside in relation to the center O of the pipe in the radial distance in a radial cross section of the pipe 42.

Here, forming an orifice 56A at an edge portion in the radial direction of the pipe 42 means that no orifice 56A is formed in a region less than ⅔ of a pipe diameter from the center O of the pipe in the radial distance.

Also, the area ratio of the cross-sectional area of the pore of the orifice 56A to the cross-sectional area of the pipe 42 is preferably 0.1 or less. The orifice 56A may have a pore shape selected from circular, oval or square shapes.

As FIG. 1 and FIG. 4 show, when the pipe 42 is horizontally arranged or inclined upward or downward toward the slot die 12, the position where the orifice 56A is formed is an edge portion in the radial direction at the upper edge of the pipe 42. However, when the pipe 42 is almost upright, the orifice 56A is formed at any position as long as it is formed at an edge portion in the pipe radial direction.

Next, preferred embodiments of the tapered inlet channel 56B and the tapered outlet channel 56C will be described.

Figure 6:
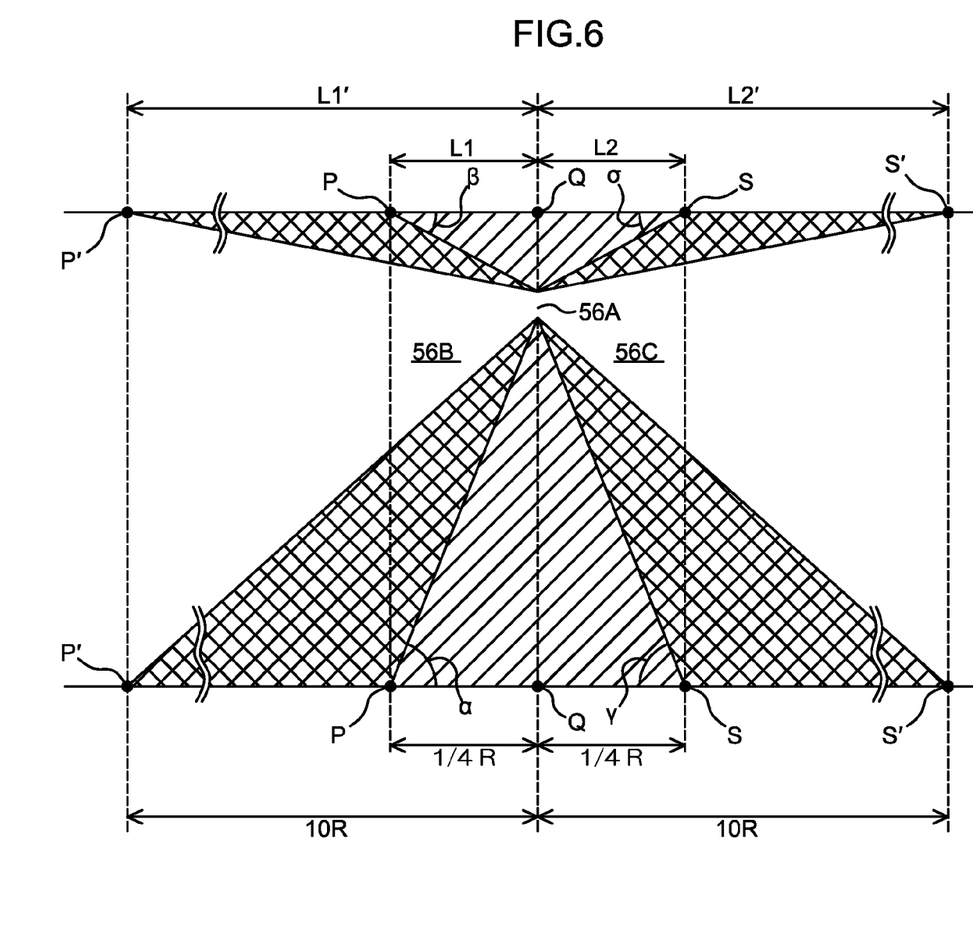
FIG. 6 is an explanatory view illustrating a tapered inlet channel and a tapered outlet channel in the orifice portion.

As FIG. 6 shows, it is preferred that when the length from the taper starting position P to the orifice position Q in the pipe longitudinal direction is represented by L1 and the diameter of the pipe is represented by R, the tapered inlet channel 56B satisfy $L1 \geq (1/4)R$.

Also, it is preferred that when the length from the orifice position Q to the taper end position R in the pipe longitudinal direction is represented by L2 and the diameter of the pipe is represented by R, the tapered outlet channel 56C satisfy $L2 \geq (1/4)R$.

As FIG. 6 shows, the smaller the L1 relative to the diameter R of the pipe, the greater value the taper angle $(\alpha+\beta)$ shifts to, and when L1 is 0 (zero), the taper angle is a right angle 90°. Conversely, the greater the L1 relative to the diameter R of the pipe, the smaller value the taper angle $(\alpha+\beta)$ shifts to, and the flatter the taper angle.

Likewise, the smaller the L2 relative to the diameter R of the pipe, the greater value the taper angle $(\gamma+\delta)$ shifts to, and when L2 is 0 (zero), the taper angle is a right angle 90°. Conversely, the greater the L2 relative to the diameter R of the pipe, the smaller value the taper angle $(\gamma+\delta)$ shifts to, and the flatter the taper angle.

The inventor has intensively studied the degree of taper of the tapered inlet channel 56B and the tapered outlet channel 56C for effectively preventing the occurrence of accumulation of bubbles or retention of liquid on the inlet side and the exit side of the orifice 56A, and as a result have found that it is important that the tapered inlet channel 56B satisfies $L1 \geq (1/4)R$ and the tapered outlet channel 56C satisfies $L2 \geq (1/4)R$.

The limit of the degree of increasing L1 and L2 to be larger than $(1/4)R$, in other words, the limit of the degree of making the taper angle flatter is preferably $10R \geq L1$ and $10R \geq L2$, more preferably $5R \geq L1$ and $5R \geq L2$, and particularly preferably $2R \geq L1$ and $2R \geq L2$. Accordingly, ranges of $10R \geq L1 \geq (1/4)R$ and $10R \geq L2 \geq (1/4)R$ marked with a lattice pattern in FIG. 6 are most preferable for preventing the accumulation of bubbles and the retention of liquid.

Figure 7:
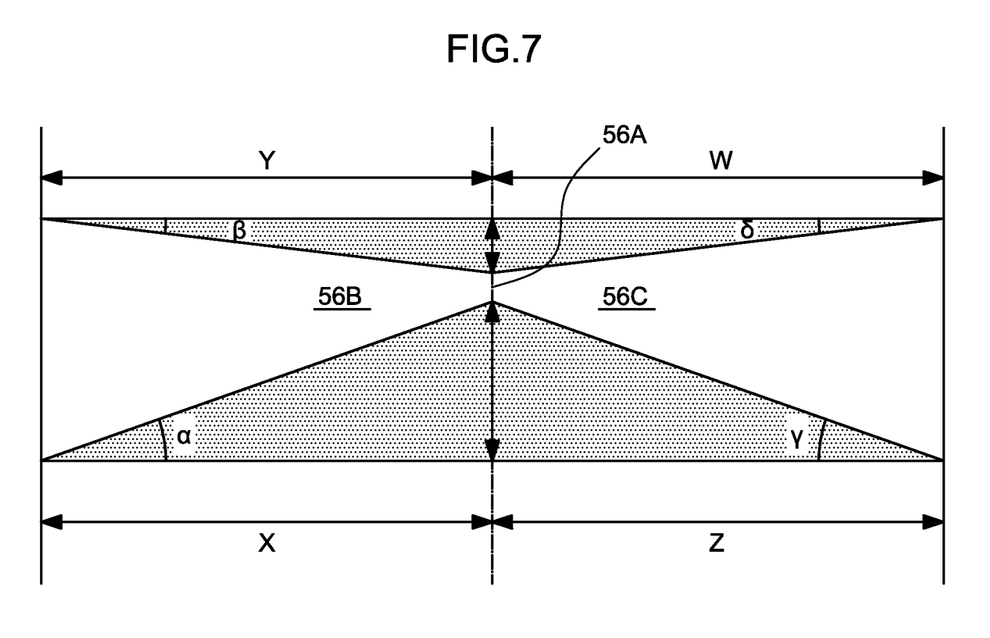
FIG. 7 is an explanatory view illustrating a modified example of a tapered inlet channel and a tapered outlet channel in the orifice portion.

When the orifice 56A is formed at a position closer to the center from the edge in the pipe radial direction as in FIG. 7, and the tapered inlet channel 56B and the tapered outlet channel 56C each form two taper angles ($\alpha$ and $\beta$, $\gamma$ and $\delta$), it is not required to satisfy equations of $L1=X=Y$ or $L2=Z=W$. X and Y may be different or Z and W may be different, or all of the X, Y, Z and W may be different.

The orifice portion 56 structured as illustrated above may be formed by restricting the pipe 42, or by separately preparing an orifice portion 56 and connecting it to the pipe 42.

[Web and Solvent for Coating Solution]

Next, preferred embodiments of webs and dispersion media for dispersing a coating solution, which are used for optical films such as anti-reflection films will be described.

Transparent plastic films are preferably used as the web W. Examples of materials of plastic films include cellulose esters (e.g., triacetyl cellulose, diacetyl cellulose, propionyl cellulose, butyryl cellulose, acetyl propionyl cellulose, nitrocellulose), polyamide, polycarbonate, polyester (e.g., polyethylene terephthalate, polyethylene naphthalate, poly-1,4-cyclohexane dimethylene terephthalate, polyethylene-1,2-diphenoxyethane-4,4'-dicarboxylate, polybutylene terephthalate), polystyrene (e.g., (syndiotactic polystyrene), polyolefin (e.g., polypropylene, polyethylene, polymethylpentene), polysulfone, polyethersulfone, polyallylate, polyetherimide, polymethyl methacrylate and polyether ketone.

In particular, triacetyl cellulose is preferably used. More specifically, known triacetyl cellulose films such as TAC-TD80U (available from FUJIFILM CORPORATION) or those published in Journal of Technical Disclosure (Kokai Giho) No. 2001-1745 are preferably used as the triacetyl cellulose film.

The web W has a light transmittance of preferably 80% or more, and more preferably 86% or more. The web W has a haze of preferably 2.0% or less, and more preferably 1.0% or less. The web W has a refractive index of preferably 1.4 to 1.7.

Although the thickness of the web W is not particularly limited, the web W has a thickness of preferably 30 to 150 μm, more preferably 40 to 130 μm and further preferably 70 to 120 μm.

Dispersion media for the coating solution are not particularly limited. They may be used alone or in a mixture of two or more. Preferred dispersion media include aromatic hydrocarbons such as toluene, xylene and styrene, chlorinated aromatic hydrocarbons such as chlorobenzene and ortho-dichlorobenzene, chlorinated aliphatic hydrocarbons including methane derivatives such as monochloromethane and ethane derivatives such as monochloroethane, alcohols such as methanol, isopropyl alcohol and isobutyl alcohol, esters such as methyl acetate and ethyl acetate, ethers such as ethyl ether and 1,4-dioxane, ketones such as acetone, methyl ethyl ketone, methyl isobutyl ketone and cyclohexanone, glycol ethers such as ethylene glycol monomethyl ether, alicyclic hydrocarbons such as cyclohexane, aliphatic hydrocarbons such as normal hexane and mixtures of aliphatic or aromatic hydrocarbons.

Of these solvents, dispersion media for coating composed of ketone alone or prepared by mixing two or more of them are particularly preferred.

In the coating apparatus of the present invention, the upper limit of possible coating rates is greatly affected by liquid properties. Therefore, it is necessary to control liquid properties, in particular, viscosities and surface tensions at the moment of coating.

The coating solution has a viscosity of preferably 0.01 Pa·s or less, more preferably 0.005 Pa·s or less, and further preferably 0.002 Pa·s or less.

Since the viscosity of some coating solution varies depending on shearing rates, the above values represent viscosities at a shearing rate at the moment of coating. When a thixotropic agent is added to a coating solution, the coating solution has a low viscosity upon coating when shearing is high and has a high viscosity upon drying when hardly subjected to shearing, and thus the addition is preferred because unevenness is less likely to be caused upon drying.

The amount of the coating solution applied to the web, which is not included in liquid properties, also has an influence on the upper limit of possible coating rates. The amount of the coating solution applied to the web is preferably 2.0 to 10 ml/m$^2$. An increase in the amount of coating solution applied to the web is preferred because the upper limit of possible coating rates is higher, but when the amount of coating solution applied to the web is increased too much, the load for drying is increased. Therefore, it is preferable to determine the optimum amount of the coating solution applied to the web depending on the formulation of the solution and the conditions of the process.

The coating solution has a surface tension ranging from preferably 15 to 36 mN/m. To reduce the surface tension by adding a leveling agent or by other methods is preferred because unevenness upon drying can be prevented. On the other hand, when the surface tension is reduced too much, the upper limit of possible coating rates is lowered, and therefore the coating solution has a surface tension ranging from more preferably 17 to 32 mN/m, further preferably 19 to 26 mN/m.

[Anti-Reflection Film]

Next, an example of a process for producing a multi-layer structure anti-reflection film will be described.

A web W wound on a roll is continuously fed to a clean chamber, and static electricity charged on the web W is eliminated by a static eliminator and contaminants attached to the web W is removed by a dust collector.

Next, a coating solution is applied to the web W by the above-described coating apparatus 10 installed in the clean chamber. More specifically, the coating solution 14 transported under pressure by a liquid feed pump 46 from a coating solution tank 40 passes through a pressure gauge 48, a vacuum deaerator 50, a filter 52 and an orifice portion 56 and is fed to a slot die 12 through pipe 42. In the feeding of the coating solution, an orifice 56A is formed at an edge portion in the pipe radial direction, and at the same time, an orifice portion 56 is provided, in which a forward tapered inlet channel 56B leading to the orifice 56A is formed on the inlet side of the orifice 56A and a rearward tapered outlet channel 56C extending from the orifice 56A is formed on the exit side of the orifice 56A. This makes it possible to not only prevent liquid feed pulsation which occurs upstream of the orifice 56A but also effectively suppress very small pulsation which occurs downstream, suppressing stepped irregularities in a coating film applied to the web W to 2% or less. Further, by providing the tapered inlet channel 56B and the tapered outlet channel 56C, accumulation of bubbles or retention of liquid which are feared to be caused by forming an orifice 56A at an edge portion will not occur.

Subsequently, the web W to which a coating solution is applied is transported to a drying chamber and dried.

The web W with the dried coating film is fed to a radiation curing chamber from the drying chamber and the coating film is cured by the polymerization of monomers contained in the coating layer by the irradiation with radiation. Further, the web W with the layer cured by radiation is sent to a heat curing portion and heated to complete curing. The web W with the layer in which curing has been completed is wound into a roll.

The above step may be performed each time a layer is formed, or some sets of a coating portion—a drying chamber—a radiation curing portion—a heat curing chamber may be provided to form each layer continuously. It is preferable to form each layer continuously in consideration of the productivity.

While a coating apparatus according to an embodiment of the present invention and a process for producing an anti-reflection film which is an example of optical films using the coating apparatus have been described above, the embodiment is not limited to anti-reflection films and is applicable to optical films such as optical compensation films, anti-glare films and anti-glare anti-reflection films.

Example 1

Next, Examples and Comparative Examples of the present invention will be described.

[Coating Solution to be Tested]

A coating solution (coating solution for anti-reflection film) of the following preparation was subjected to a test. Specifically, to 93 g of a methyl ethyl ketone solution having a refractive index of 1.42 and containing 6% by weight of a thermally crosslinking fluorine-containing polymer (JN- 7228, available from JSR Corporation) were added 8 grams (g) of MEK-ST (a dispersion in methyl ethyl ketone of $SiO_2$ sol having an average particle size of 10 nm to 20 nm and a solid concentration of 30% by weight, available from Nissan Chemical Industries, Ltd.), 94 g of methyl ethyl ketone and 6 g of cyclohexanone, and the mixture was stirred. Subsequently, the mixture was filtered with a polypropylene filter (PPE-01) having a pore diameter of 1 μm to prepare a coating solution for a low refractive index layer. The coating solution has a viscosity of 0.0007 Pa·s (0.7 cp) and a surface tension of 23 mN/m (23 dyn).

[Coating Conditions]

Using the coating apparatus 10 shown in FIG. 1, the coating solution 14 was supplied to the slot die 12 from the coating solution tank 40 by the liquid feed pump 46 (a diaphragm pump) through the pipe 42. The coating solution 14 was applied to a continuously running web W through the slot die 12.

The coating rate of the coating solution 14 (running rate of the web W) was 40 m/minute and the feed flow rate to the slot die 12 was 385 ml/minute. The opening width (slot clearance) of the slot 20 was set at 150 μm. Triacetyl cellulose (TAC) having a width of 1500 mm was used as the web W. The coating solution was applied to the web W in a coating width of 1400 mm.

The occurrences of liquid feed pulsation, accumulation of bubbles and retention of liquid of the coating solution 14 were compared with changing the structure of the orifice portion 56 built in the pipe 42 as in Tests 1 to 12 shown in the following FIG. 8A to FIG. 9F. Conditions of the liquid feed pump 46, the vacuum deaerator 50 and the filter 52 are the same throughout the Tests 1 to 12, and so the details are not shown.

Test 1

Figure 8A:
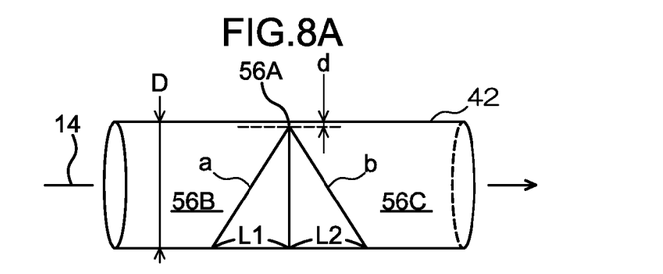
FIGS. 8A to 8F are explanatory views illustrating structures of orifice portions used in Tests 1 to 6 of Examples.

As FIG. 8A shows, an orifice 56A is formed at an upper edge portion in the pipe radial direction, and a forward tapered inlet channel 56B leading to the orifice 56A is formed on the inlet side of the orifice 56A and a rearward tapered outlet channel 56C extending from the orifice 56A is formed on the exit side of the orifice 56A. In the tests with a tapered inlet channel 56B and a tapered outlet channel 56C, the lengths of L1 and L2 are the same in the respective tests, and L1=2R and L2=2R are satisfied. The coating solution 14 flows from left to right as shown by the arrow in FIG. 8A, and the flow is the same in the Tests 2 to 12. In Test 1 to 12, an aperture diameter of the orifice 56A was 1.2 mm.

Test 2

Figure 8B:
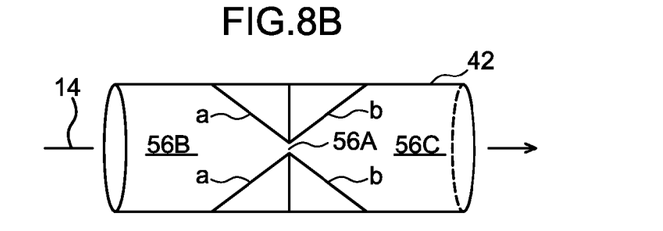

As FIG. 8B shows, an orifice 56A is formed at a central position in the pipe radial direction and a tapered inlet channel 56B and a tapered outlet channel 56C are formed.

Test 3

Figure 8C:
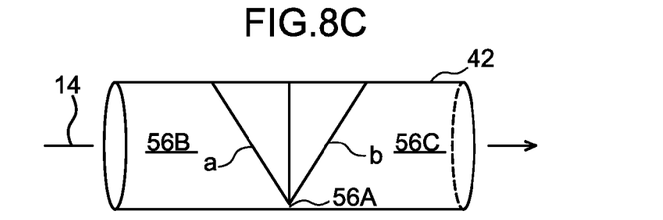

As FIG. 8C shows, an orifice 56A is formed at a lower edge portion in the pipe radial direction and a tapered inlet channel 56B and a tapered outlet channel 56C are formed.

Test 4

Figure 8D:
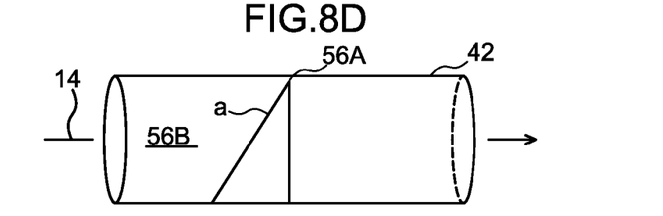

As FIG. 8D shows, an orifice 56A is formed at an upper edge portion in the pipe radial direction and only a tapered inlet channel 56B is formed.

Test 5

Figure 8E:
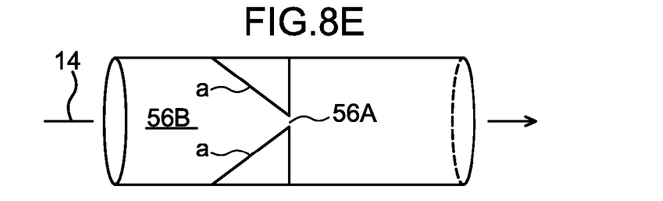

As FIG. 8E shows, an orifice 56A is formed at a central position in the pipe radial direction and only a tapered inlet channel 56B is formed.

Test 6

Figure 8F:
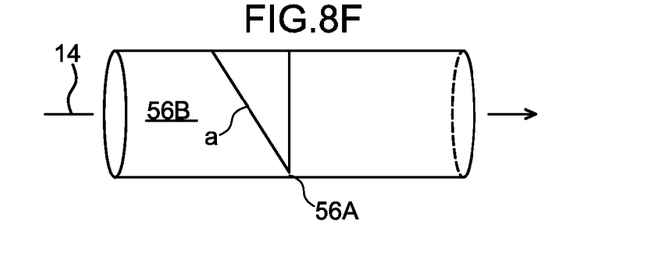

As FIG. 8F shows, an orifice 56A is formed at a lower edge portion in the pipe radial direction and only a tapered inlet channel 56B is formed.

Test 7

Figure 9A:
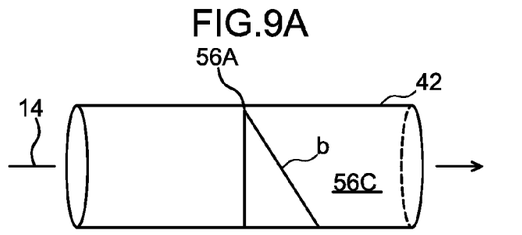
FIGS. 9A to 9F are explanatory views illustrating structures of orifice portions used in Tests 7 to 12 of Examples.

As FIG. 9A shows, an orifice 56A is formed at an upper edge portion in the pipe radial direction and only a tapered outlet channel 56C is formed.

Test 8

Figure 9B:
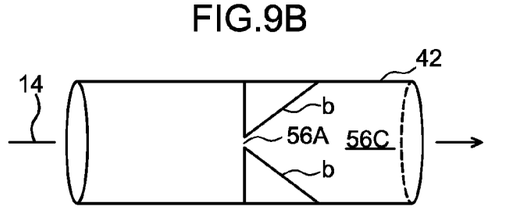

As FIG. 9B shows, an orifice 56A is formed at a central position in the pipe radial direction and only a tapered outlet channel 56C is formed.

Test 9

Figure 9C:
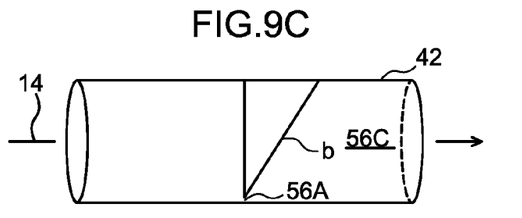

As FIG. 9C shows, an orifice 56A is formed at a lower edge portion in the pipe radial direction and only a tapered outlet channel 56C is formed.

Test 10

Figure 9D:
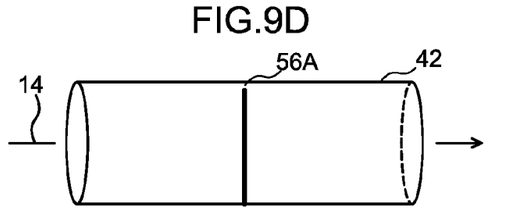

As FIG. 9D shows, an orifice 56A is formed at an upper edge portion in the pipe radial direction and no tapered inlet channel 56B or tapered outlet channel 56C is formed.

In the Tests 11 and 12 shown below, the acceptable limits of edge portions in the pipe radial direction where an orifice 56A was formed were examined. The coating solution, coating conditions, web and the like are the same as those in the Tests 1 to 10.

Test 11

Figure 9E:
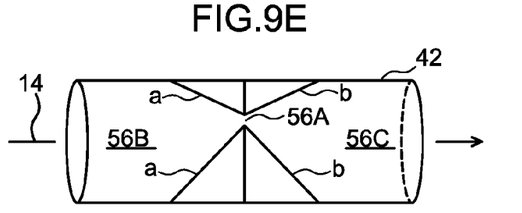

As FIG. 9E shows, an orifice 56A was formed in a manner that the center of the orifice was at a position ½ of the pipe diameter from the center O of the pipe in the radial distance in a radial cross section of the pipe 42.

Test 12

Figure 9F:
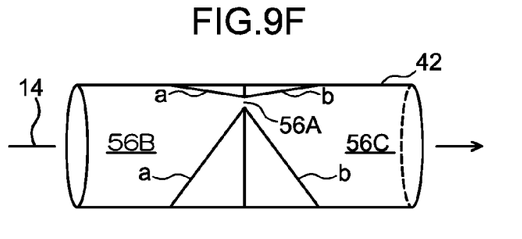

As FIG. 9F shows, an orifice 56A was formed in a manner that the center of the orifice was at a position ⅔ of the pipe diameter from the center O of the pipe in the radial distance in a radial cross section of the pipe 42.

In the Tests 1 to 12, a transparent resin pipe having a diameter R (see FIG. 5) of 15 mm was used as the pipe 42. Also, a round pipe in which the area ratio of the cross-sectional area of the orifice 56A to the cross-sectional area of the pipe was 0.1 was used throughout the Tests 1 to 12.

[Measurement of Liquid Feed Pulsation]

Liquid feed pulsation was measured by a differential pressure gauge 60 provided on the pipe 42 between the slot die and the orifice portion as shown in FIG. 1. The liquid feed pulsation was measured by using Precision Pressure Transmitter (PTX 620 Series) available from GE Sensing Japan, Ltd. connected to Data Recorder (Model NR2000) available from KEYENCE CORPORATION as the differential pressure gauge. The results are shown by a pulsation percentage (%) which is an intensity peak of pulsation pressure waves divided by an average pressure. Those with a pulsation percentage of 1% or less were regarded as pass. Accordingly, stepped irregularities in the coating film applied to the web W can be kept at 2% or less.

[Evaluation of Accumulation of Bubbles]

The occurrence of accumulation of bubbles and the site of accumulation of bubbles were visually observed from the outside the transparent pipe 42. Those evaluated as A were regarded as pass.

A . . . No accumulation of bubbles occurred.

B . . . Accumulation of bubbles occurred on the inlet side of the orifice.

C . . . A little accumulation of bubbles occurred at the exit of the orifice.

D . . . Much accumulation of bubbles occurred on the exit side of the orifice.

E . . . Much accumulation of bubbles occurred both at the inlet and the exit of the orifice

[Evaluation of Retention of Liquid]

The occurrence of retention of liquid was visually observed from the outside of the transparent pipe 42. Those evaluated as A were regarded as pass.

A . . . No retention of liquid occurred.
B . . . Retention of liquid occurred on the inlet side of the orifice.
C . . . A little retention of liquid occurred at the exit of the orifice.
D . . . Much retention of liquid occurred on the exit side of the orifice.
E . . . Much retention of liquid occurred both at the inlet and the exit of the orifice.

[Overall Evaluation]

Those which marked pass for all of the above evaluation items of liquid feed pulsation, accumulation of bubbles and retention of liquid were evaluated as A and those which marked failure for any of them were evaluated as E.

[Test Results]

Figure 10:
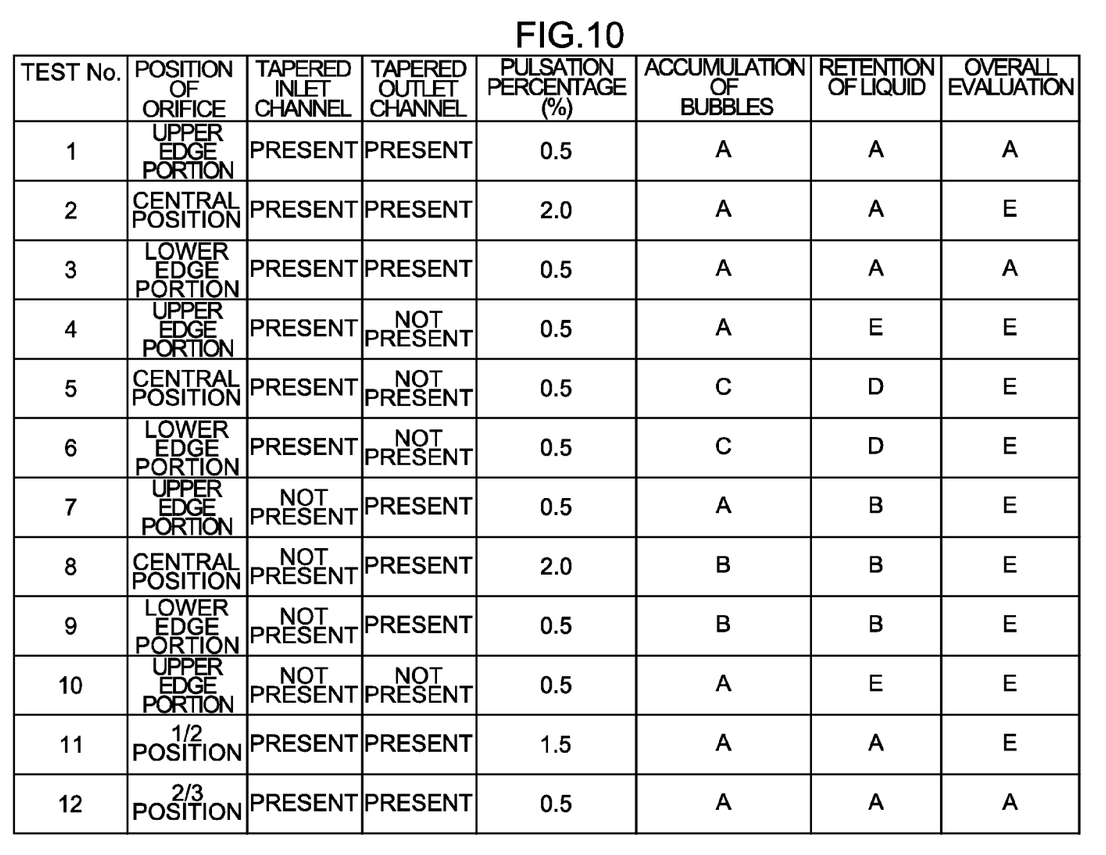
FIG. 10 is a table showing test results of Tests 1 to 12 of Examples.

The results of the Tests 1 to 12 are shown in the table of FIG. 10.

As seen from the results of the Tests 1 to 12 in the table of FIG. 10, Tests 1 and 3 in which an orifice 56A was formed at an edge portion in the pipe radial direction and a tapered inlet channel 56B and a tapered outlet channel 56C were formed were marked pass for all of the liquid feed pulsation (0.5%), the accumulation of bubbles (A) and the retention of liquid (A), and their overall evaluation was A.

The comparison between Tests 1, 2, 11 and 12 shows that the pulsation percentage was 0.5% when the edge portion in the pipe radial direction where an orifice 56A was formed was at a position ⅔ of the pipe diameter from the center O of the pipe in the radial distance in a radial cross section of the pipe 42.

On the other hand, when the orifice 56A was formed at a central position in the pipe radial direction (Tests 2, 8), the pulsation percentage was as high as 2.0%. However, Test 5 in which orifice 56A was formed at a central position in the pipe radial direction had a pulsation percentage of 0.5%, which was lower than those of Tests 2 and 8. Also, Test 11 in which the orifice 56A was formed at a position ½ of the pipe diameter in the pipe radial direction had a pulsation percentage of 1.5%, failing to pass the criterion of 1% or less.

The above results show that to prevent liquid feed pulsation which occurs upstream of the orifice 56A with the orifice 56A and suppress very small pulsation which occurs downstream of the orifice to keep pulsation percentages at 1% or less, an orifice 56A may be formed in a region ⅔ of the pipe diameter or more outside in relation to the center O of the pipe in the radial distance in a radial cross section of the pipe 42.

Also, although the presence of a tapered inlet channel 56B has a great influence mainly on the occurrence of accumulation of bubbles, as long as the orifice is formed at an upper edge portion as in Test 7 and Test 10, the accumulation of bubbles was evaluated as A even without the tapered inlet channel 56B.

Further, although the presence of a tapered outlet channel 56C has a great influence on the retention of liquid, when the orifice was formed at a central position or a lower edge portion as in Test 8 and Test 9, accumulation of bubbles and retention of liquid occurred on the inlet side without the tapered inlet channel 56B even with the tapered outlet channel 56C.

To summarize the above test results, when an orifice is formed at an edge portion in the pipe radial direction and tapered channels are formed on the inlet side and the exit side of the orifice, all of the pulsation, the accumulation of bubbles and the retention of liquid can be suppressed. Also, as is apparent from Test 5, it is considered that the absence of the tapered outlet channel causes accumulation of bubbles or retention of liquid to get worse, but is better for the pulsation. Further, as is apparent from Tests 4 and 7, when the orifice 56A is formed at an upper edge portion in the pipe radial direction, the problem of accumulation of bubbles can be solved but the problem of retention of liquid cannot be solved.

What is claimed is:

1. A film production method, comprising:
a coating step of applying a coating solution on a continuously running support from a slot die using a coating apparatus to form a coating layer; and
a drying step of drying the coating layer which has been formed in the coating step,
wherein the coating apparatus comprises:
the slot die configured to apply the coating solution on a continuously running support by discharging the coating solution from a tip of a slot and forming a coating solution bead in a clearance between the tip of the slot and the support;
a pipe through which the coating solution is fed to a pocket of the slot die;
an orifice formed in the pipe at a position nearer a circumference of a circular cross section in a radial direction of the pipe than a center of the circular cross section, the position where the orifice is formed is in a region ⅔ of a diameter of the pipe or more outside in relation to a center of the pipe in a radial distance in the circular cross section of the pipe;
a forward tapered inlet channel which is formed at an entrance side of the orifice in the pipe and whose aperture narrows to the orifice; and
a rearward tapered outlet channel which is formed at an exit side of the orifice in the pipe and whose aperture grows toward a downstream.

2. The film production method according to claim 1, wherein the film is any one of an optical compensation film, an anti-reflection film, an anti-glare film and an anti-glare anti-reflection film.

3. The film production method according to claim 2, wherein the produced film has stepped irregularities of 2% or less.

4. The film production method according to claim 2, wherein the produced film has stepped irregularities of 1% or less.

5. The film production method according to claim 1, wherein the coating solution has a viscosity of 0.01 Pa·s or less.

6. The film production method according to claim 1, wherein the coating solution has a viscosity of 0.005 Pa·s or less.

7. The film production method according to claim 1, wherein the coating solution has a viscosity of 0.002 Pa·s or less.

8. The film production method according to claim 1, wherein an amount of the coating solution applied to the support is 2.0 to 10 ml/m$^2$.

9. The film production method according to claim 1, wherein the coating solution has a surface tension of 15 to 36 nM/m.

10. The film production method according to claim 1, wherein the coating solution has a surface tension of 17 to 32 nM/m.

11. The film production method according to claim 1, wherein the coating solution has a surface tension of 19 to 26 nM/m.

12. The film production method according to claim 1, wherein a pulsation percentage is about 0.5%.

* * * * *